United States Patent [19]

Kobayashi et al.

[11] Patent Number: 5,021,227

[45] Date of Patent: Jun. 4, 1991

[54] METHOD OF REMOVING NITROGEN OXIDES IN EXHAUST GASES FROM A DIESEL ENGINE

[75] Inventors: Motonobu Kobayashi; Futoru Kinoshita; Mitsuharu Hagi, all of Hyogo; Akira Inoue; Terushige Uno, both of Osaka, all of Japan

[73] Assignee: Nippon Shokubai Kagaku Kogyo Co., Ltd., Osaka, Japan

[21] Appl. No.: 474,274

[22] Filed: Feb. 2, 1990

[30] Foreign Application Priority Data

Feb. 2, 1989 [JP] Japan .................................. 1-25209
Feb. 2, 1989 [JP] Japan .................................. 1-25210

[51] Int. Cl.$^5$ ...................... B01D 47/00; B01D 51/34; B01J 8/00; C01B 21/00
[52] U.S. Cl. ..................................... 423/212; 423/239
[58] Field of Search .................... 423/212, 239, 239 A

[56] References Cited

U.S. PATENT DOCUMENTS

| | | | |
|---|---|---|---|
| 3,832,848 | 9/1974 | Scholl | 423/212 |
| 4,400,352 | 8/1983 | Rehnberg et al. | 423/212 |
| 4,403,473 | 9/1983 | Gladder | 423/212 |

*Primary Examiner*—Gregory A. Heller
*Attorney, Agent, or Firm*—Klauber & Jackson

[57] ABSTRACT

The present invention concerns a method of removing nitrogen oxides in exhaust gases from a diesel engine by using a catalyst in a reacter under the presence of ammonia, wherein a humidity of in-take air as a specific factor and one or more of engine power, fuel consumption amount of engine, temperature of engine in-take air and exhaust gas temperature as selective factors are measured respectively as the measuring factors and the flow rate of ammonia is controlled based on measured values and ammonia is supplied to an exhaust gas flow channel from the engine to the reactor.

7 Claims, 9 Drawing Sheets

METHOD OF REMOVING NITROGEN OXIDES IN EXHAUST GASES FROM A DIESEL ENGINE

BACKGROUND OF THE INVENTION

1. Field of the Invention

The present invention concerns a method of removing nitrogen oxides in exhaust gases from a diesel engines.

2. Description of the Prior Art

As a method of removing nitrogen oxides in an oxidative atmosphere, selective reducing denitration method using ammonia as a reducing agent has been considered most effective in an oxidative atmosphere since nitrogen oxides and ammonia are brought into selective reaction free from the effect of oxidation concentration in exhaust gases and, accordingly, it has been applied generally for the purification of exhaust gases from stationary or gas generation sources such as boilers in thermoelectric power plants and heating furnaces.

On the other hand, various examples of applying the ammonia selective reduction method have been disclosed also for the reduction of nitrogen oxides in exhaust gases from internal combustion engines. For instance, there has been disclosed, for example, a method of supplying ammonia in proportion with the amount of fuel consumption into exhaust gases and the resultant gas mixture is passed through a reactor charged with a pellet-like catalyst thereby removing nitrogen oxide (refer to Japanese Patent Publication No. Sho 58-501001).

However, in a case of diesel engines, since the changes of engine loads are remarkable as compared with those in boilers, and it causes abrupt change in the amount of the exhaust gases and the concentration of nitrogen oxides, the foregoing prior art can not attain a sufficient effect for precisely controlling the amount of ammonia in accordance with such changes. Accordingly, there has been left a problem in removing nitrogen oxides in exhaust gases at a high efficiency and restricting discharged ammonia as low as possible. Further, efficiency removing of nitrogen oxides in exhaust gases is concerned with a reaction efficiency in a reactor substantially in a proportional relationship. Then, for improving the reaction efficiency, it is important that ammonia supplied to the exhaust gases is mixed uniformly with the nitrogen oxides in the gases.

Then, a mixed method using a buffle plate, venturi or packing has generally been employed. However, a method of supplying ammonia by disposing a plurality of nozzle ports to an exhaust pipe at the upstream to the reactor between a superfeeder and the reactor, and a method and an apparatus for supplying ammonia through a supply port in the form of a spray nozzle should not hinder the operation of the engine itself.

In this regard, the mixing method of using the buffle plate, venturi or the packing material results in the reduction of an engine power in a diesel engine due to great pressure loss, which worsens the fuel cost of the engine and results in a disadvantage to the engine itself.

Further, in the mixing method of disposing a plurality of nozzles in an exhaust gas flow channel at the upstream on the side of the reactor between the super feeder and the reactor for supplying ammonia, it is difficult to uniformly mix ammonia to the exhaust gases, in which the efficiency of removing nitrogen oxides in the exhaust gases on a denitrating catalyst is rather reduced but not improved and, accordingly, this method can not be said to provide a high reaction efficiency.

Further, in the mixing method of supplying ammonia from the spray nozzle, since dusts contained in the exhaust gases cause clogging to the spray port, this may worsen the spraying of ammonia and clog the nozzle to require frequent cleaning or displacement of nozzles.

In addition, in a case of a relatively small sized diesel engine, it is also important that the exhaust gas processing system therefor is inexpensive.

SUMMARY OF THE INVENTION

A first object of the present invention is to provide a method of removing nitrogen oxides capable of efficiently removing nitrogen oxides in exhaust gases from a diesel engine even upon abrupt changes of the conditions of exhaust gases, by bringing the nitrogen oxides into contact with a catalyst under the presence of ammonia, capable of coping with the change of the amount of the nitrogen oxides due to the change of the combustion performance of the engine and capable of lowering ammonia content after the removal of the nitrogen oxides as much as possible.

A second object of the present invention is to provide a method of removing nitrogen oxides capable of conducting without hindering the operation of an engine (the foregoing first object).

A method of removing nitrogen oxides in exhaust gases from a diesel engine for attaining the first object in accordance with the present invention is adapted for reducing to remove nitrogen oxides in exhaust gases from a diesel engine by using a catalyst in a reactor under the presence of ammonia, wherein humidity of in-taken air as a specific factor and one or more of engine power, fuel consumption amount of engine, temperature of engine in-take air and exhaust gas temperature as selective factors are measured respectively as the measuring factor, the flow rate of ammonia is controlled based on the measured values and ammonia is supplied into an exhaust gas flow channel from an engine to a reactor.

In a first aspect of the present invention for the method of removing nitrogen oxides in exhaust gases from a diesel engine, measuring factor comprises humidity of in-take air, engine power and exhaust gas temperature.

In a second aspect of the present invention for the method of removing nitrogen oxides in exhaust gases from a diesel engine, measuring factor comprises humidity of in-take air, engine power, exhaust gas temperature, and temperature of engine in-take air.

In a third aspect of the present invention for the method of removing nitrogen oxides in exhaust gases from a diesel engine, measuring factor comprises humidity of in-take air and fuel consumption amount of engine.

In a fourth aspect of the present invention for the method of removing nitrogen oxides in exhaust gases from a diesel engine, measuring factor comprises humidity of in-take air, fuel consumption amount of engine and temperature of engine in-take air.

In a fifth aspect of the present invention for the method of removing nitrogen oxides in exhaust gases from a diesel engine, ammonia is supplied in an exhaust gas flow channel between a supercharger and a reactor on the downstream thereto.

Further, in s a sixth aspect for attaining the second purpose of the present invention for the method of removing nitrogen oxides in exhaust gases from a diesel engine, ammonia is supplied to an exhaust gas flow channel on the upstream to a supercharger.

Figure 3:
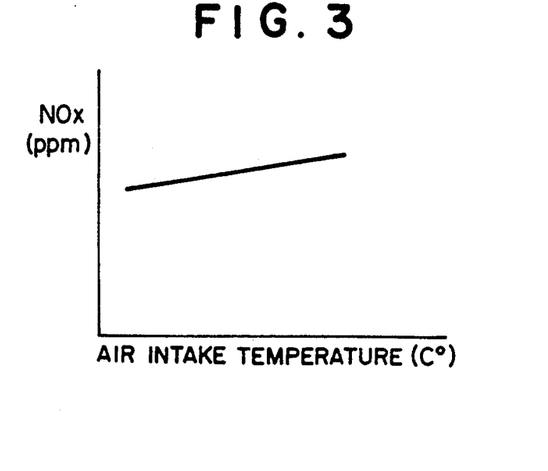
FIG. 3 is a graph illustrating a relationship between a feed temperature of a diesel engine and a concentration of nitrogen oxide.
Figure 4:
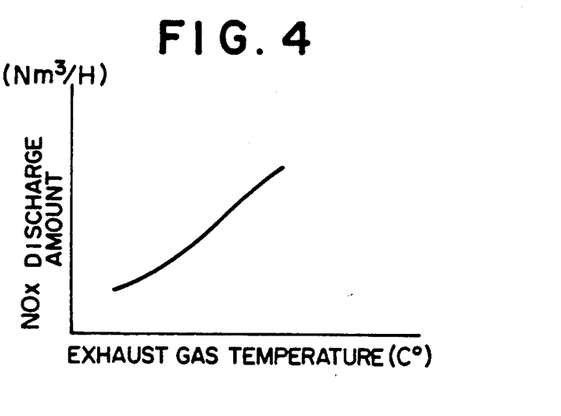
FIG. 4 is a graph illustrating a relationship between an exhaust gas temperature and a discharge amount of nitrogen oxide.
Figure 5:
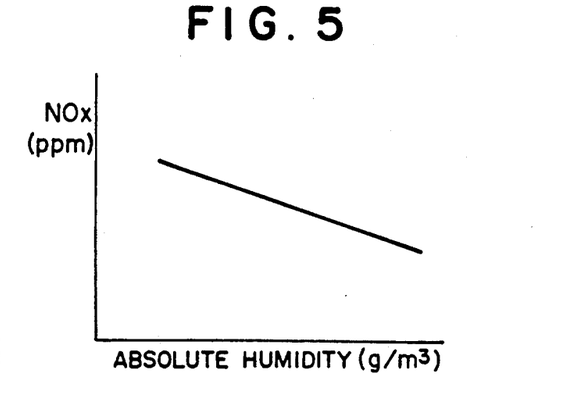
FIG. 5 is a graph illustrating a relationship between an absolute humidity of in-take air of a diesel engine and a concentration of nitrogen oxides.

According to the study made by the present inventors, it has been found that the total amount of nitrogen oxides discharged from a diesel engine is increased or decreased substantially in proportion with the engine power, fuel consumption amount of engine, temperature of engine in-take air and exhaust gas temperature as shown in FIGS. 1 to 4, as well as decreased or increased in proportion with the humidity of in-take air as shown in FIG. 5, respectively.

Figure 1:
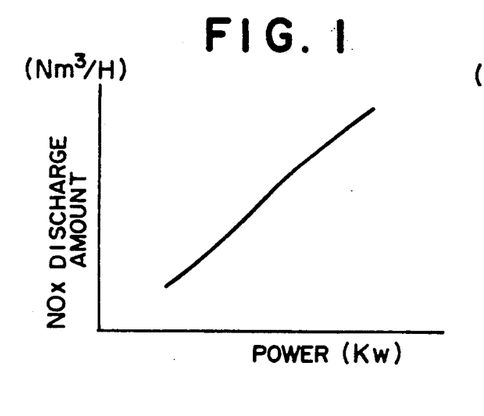
FIG. 1 is a graph illustrating a relationship between a power of a diesel engine and a discharge amount of nitrogen oxides.
Figure 2:
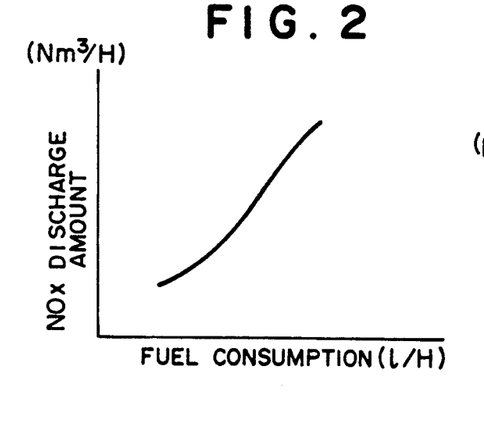
FIG. 2 is a graph illustrating a relationship between a fuel consumption amount of a diesel engine and a discharge amount of nitrogen oxides.

That is, as shown in FIG. 1 to 3, since the discharge amount of nitrogen oxides is in proportion with the engine power, fuel consumption amount of engine and the engine exhaust gas temperature, the amount of ammonia to be supplied can be controlled by supplying ammonia in accordance with the engine power, fuel consumption amount of engine and exhaust gas temperature. However, since the concentration of the nitrogen oxides undergoes a remarkable effect of atmospheric conditions, that is, not only the exhaust temperature but also humidity of in-take air, it is important to measure the temperature and the humidity of in-take air and further correct the discharge amount of nitrogen oxides based on the measured values.

In particular, in a case of controlling the amount of ammonia supplied depending on the engine power, since the correlationship between the discharge amount of the nitrogen oxides and the engine power changes with lapse of time due to the contaminations to the engine or the super charger, it is necessary to measure the temperature of engine exhaust gases as shown in FIG. 4 and correct the discharge amount of the nitrogen oxides depending on the measured value.

Accordingly, the total amount of the nitrogen oxides discharged from the engine is directly determined by measuring the engine power, fuel consumption amount of engine, exhaust gas temperature, temperature and the humidity of the in-take air and the amount of ammonia supplied is determined in proportion with the thus obtained total discharge amount of the nitrogen oxides.

It has thus been confirmed that even if the discharge amount and the concentration of nitrogen oxides change abruptly, an optimum amount of ammonia can be supplied correctly with no time delay in proportion with the discharge amount and the concentration and the nitrogen oxides in the exhaust gases can effectively be removed, and the residual ammonia in the exhaust gases after the removal of the nitrogen oxides can be reduced as much as possible.

Further, it has also been confirmed that, by supplying ammonia under flow rate control to the exhaust gas flow channel at the upstream of the supercharger, the nitrogen oxides in the exhaust gases and ammonia are sufficiently mixed previously before leaching the reactor thereby enabling to improve the reaction efficiency and further enhance the efficiency for removing the nitrogen oxide.

DESCRIPTION OF THE PREFERRED EMBODIMENTS

The present invention is to be described more in details.

Figure 6:
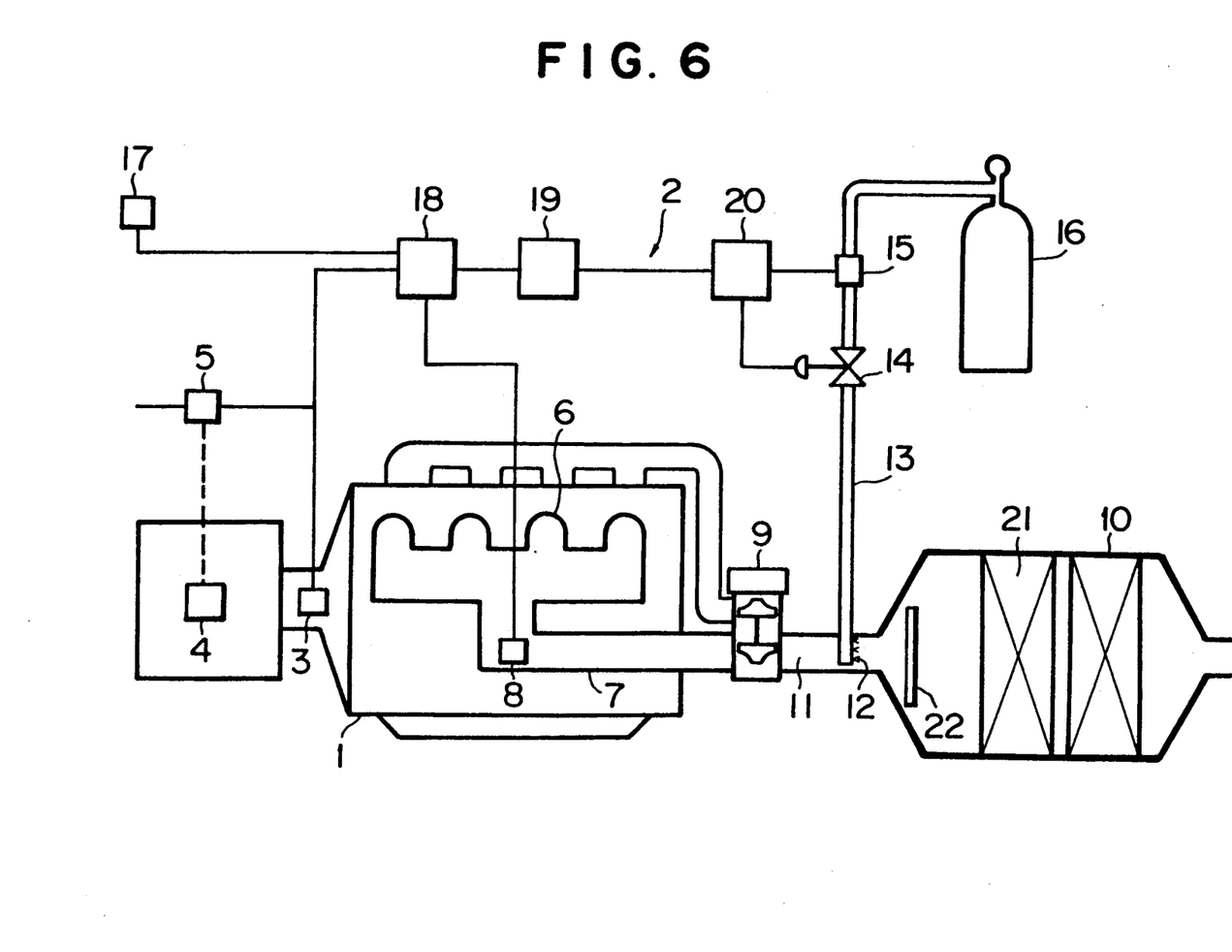
FIG. 6 is a schematic view of a diesel engine equipped with an exhaust gas purifying device for conducting the method as the first aspect of the present invention.

An exhaust gas purifying device 2 equipped to an engine main body 1 shown in FIG. 6 illustrates an example developed for practicing the first aspect according to the present invention, in which a power meter 3 or a power proportional signalling device 5 for a driven machine 4 is disposed to the engine main body 1, and an exhaust gas temperature detector 8, a supercharger 9 and a reactor 10 are disposed to an exhaust pipe 7 in communication with a manifold 6 of the engine main body 1. Further, an ammonia transport pipe 13 is connected to an ammonia injection nozzle 12 disposed in an exhaust gas flow channel 11 in the exhaust pipe 7 at the upstream to a reactor 10, and an ammonia control valve 14 and an ammonia flow meter 15 are disposed to the ammonia transport pipe 13, as well as an ammonia vessel 16 is connected with the pipe 13.

Then, the power meter 3 or the power proportional signalling device 5, the exhaust gas temperature detector 8 and a detector 17 for measuring the humidity of in-take air in the engine main body 1 are connected to a calculator 18, which is connected by way of a ratio setter 19 and an ammonia flow rate controller 20 to the ammonia control valve 14.

That is, in response to the load of the engine main body 1, respective signals from the engine power meter 3 or the power proportional signalling device 5, the exhaust gas temperature detector 8 and the detector 17 for the in-take air are inputted into the calculator 18. In the calculator 18, the total discharge amount of the nitrogen oxides is calculated and a signal is inputted into the ratio setter 19, in which the amount of ammonia to be supplied is determined based on an ammonia/nitrogen oxide ratio previously set by the ratio setter 19.

The output from the ratio setter 19 is inputted as an ammonia flow rate signal into the ammonia flow rate controller 20 to control the ON-OFF of the ammonia control valve 14 and control the amount of ammonia to be mixed with exhaust gases flown into the reactor 10.

The exhaust gases are flown from the manifold 6 by way of the exhaust pipe 7 into the reactor 10 charged with a catalyst 21.

Ammonia is supplied from the ammonia vessel 16 by way of the ammonia transport pipe 13 and, after controlled to an optimum flow rate by the ammonia control valve 14, mixed from the ammonia injection nozzle 12 with the exhaust gases in the exhaust pipe 7 and, after mixed and dispersed as required by a gas diffusion plate 22, passed through the catalyst 21 to reduce and eliminate the nitrogen oxides in the exhaust gases.

Then, the amount of ammonia supplied is determined in proportion with the amount of the concentration of the nitrogen oxides in the exhaust gases determined based on the measured values for the humidity of the in-take air, the engine power and the exhaust gas temperature, by which ammonia is supplied at a more exact optimal amount with a good responsivity corresponding to the total amount of the nitrogen oxides in the exhaust gases, by which the nitrogen oxides can always be removed efficiently in accordance with the engine load and residue of ammonia after the removal can be suppressed as much as possible.

The present invention is to be explained next referring to the examples but the invention is not restricted only to these examples.

EXAMPLE

A $TiO_2$ honeycomb catalyst containing 2% by weight of $V_2O_5$ and 7% by weight of $WO_3$ (3.2 mm diameter corresponding to 150 mm square, 0.6 mm cell wall thickness and 450 mm length) was charged by 6×6 in two layers to a reactor in communication with the exhaust pipe 7 of an electric power generating diesel engine. The calculator 18 and the ratio setter 19 were operated by the device 2 so that the ammonia/nitrogen oxide molar ratio was 0.85 and ammonia was injected into the exhaust gases in the exhaust pipe, and the engine was operated while varying the exhaust gas processing amount from 3,500 to 5,500 $Nm^3$/hr, the exhaust gas temperature from 380° to 430° C. and the nitrogen oxide concentration at the inlet from 700 to 950 ppm. In this case, the denitration ratio was 83 to 86% and the ammonia concentration in the exhaust gases at the exit of the reactor was 0.5 to 1.0 ppm.

It can be understood from the above that the method is excellent in that it can remove nitrogen oxides at high efficiency with less variation range for denitration ratio and with extremely less ammonia discharge, which would other wise cause secondary public pollution.

Figure 7:
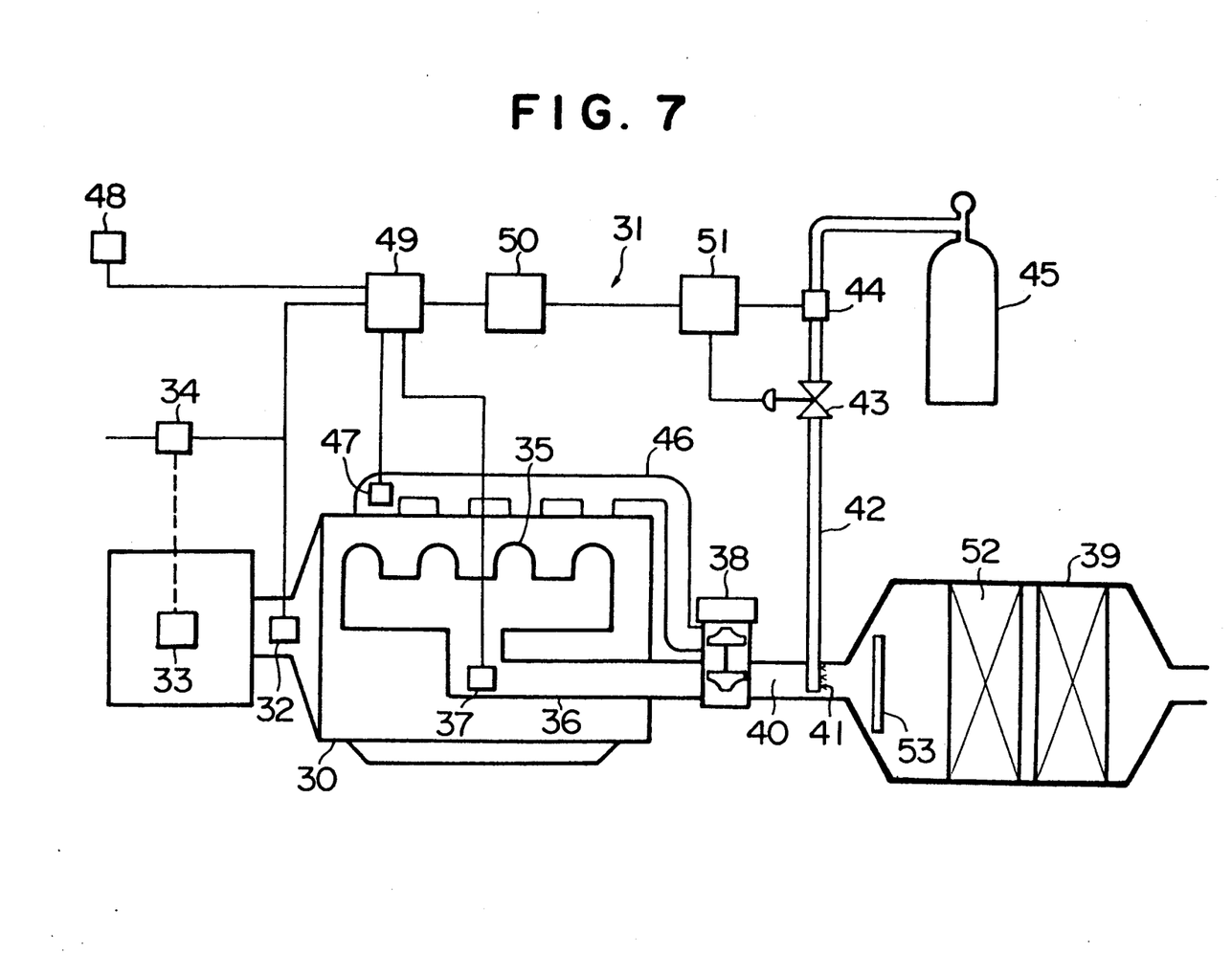
FIG. 7 is a schematic view of a diesel engine equipped with an exhaust gas purifying device for conducting the method as the second aspect of the present invention.

An exhaust gas purifying device 31 equipped with an engine main body 30 shown in FIG. 7 illustrates an example developed for practicing the second aspect of the present invention, in which a power meter 32 or a power proportional signalling device 34 for a driven machine 33 are disposed to the engine main body 30, and an exhaust gas temperature detector 37, a supercharger 38 and a reactor 39 are disposed to an exhaust gas pipe 36 in communication with a manifold 35 of the engine main body 30. Further, an ammonia transport pipe 42 is connected with an ammonia injection nozzle 41 disposed to an exhaust gas flow channel 40 in the exhaust pipe 36 at the upstream to the reactor 39, and an ammonia control valve 43 and an ammonia flow meter 44 are disposed to the ammonia transport pipe 42, as well as an ammonia vessel 45 is connected to the pipe 42. Further, a feed temperature detector 47 is disposed to feed pipe 46 for connecting the supercharger 38 with the engine main body 30.

Then, the power meter 32 or, the power proportional signalling device 34, the exhaust gas temperature detector 37, the feed temperature detector 47 and a humidity detector 48 for measuring the humidity of in-take air of the engine main body 30 are connected with a calculator 49, which is connected by way of a ratio setter 50 and an ammonia flow rate controller 51 to the ammonia control valve 43.

That is, in response to the load of the engine main body 30, the respective signals from the engine power meter 32 or the proportional signalling device 34, the exhaust gas temperature detector 37, the feed temperature detector 47 and the in-take air humidity detector 48 are inputted into the calculator 49. In the calculator 49, the total discharge amount of the nitrogen oxides is calculated and a signal is inputted into the ratio setter 50, in which the amount of ammonia to be supplied is determined based on a ammonia/nitrogen oxide ratio previously set by the ratio setter 50.

Then, the output from the ratio setter 50 is inputted as an ammonia flow rate signal into an ammonia flow rate controller 51, which controls ON-OFF of the ammonia control valve 43 and control the amount of the ammonia to be mixed with exhaust gases flowing into the reactor 39.

Exhaust gases are flown from the manifold 35 by way of the exhaust pipe 36 into the reactor 39 charged with a catalyst 52.

Ammonia is supplied from the ammonia vessel 45 by way of the ammonia transport pipe 42 and, after controlled to an optimal flow rate by the ammonia control valve 43, mixed by way of the ammonia injection nozzle 41 in the exhaust pipe 36 into exhaust gases and mixed and dispersed as required by a gas dispersion plate 53, passed through the catalyst 52 and reduces to remove nitrogen oxides in the exhaust gases.

Thus, the amount of ammonia supplied is determined in proportion with the amount and the concentration of the nitrogen oxides in the exhaust gases determined based on the measured values for the humidity of in-take air, engine power, exhaust gas tempertaure and feed air temperature, by which ammonia in a more exact optimal amount can be supplied with good responsivity to the total amount of the nitrogen oxides in the exhaust gases, and the nitrogen oxides can be always removed at a high efficiency corresponding to the engine load and the residue of ammonia after the removal can be suppressed as much as possible.

This invention will now be described more in details referring to example but the invention is not limited only to these example.

EXAMPLE

A $TiO_2$ honeycomb catalyst containing 2% by weight of $V_2O_5$ and 7% by weight of $WO_3$ (3.2 mm diameter corresponding to 150 mm square, 0.6 mm cell wall thickness and 450 mm length) was charged by $6 \times 6$ in two layers to the the reactor 39 in communication with the exhaust pipe 36 of a electric power generating diesel engine.

The calculator 49 and the ratio setter 50 were operated by the device 31 so that the ammonia/nitrogen oxide molar ratio was 0.85 and ammonia was injected into the exhaust gases in the exhaust pipe, and the engine was operated while varying the exhaust gas processing amount from 3,500 to 5,500 $Nm^3$/hr, the exhaust gas temperature from 380° to 430° C. and the nitrogen oxide concentration at the inlet from 700 to 950 ppm. In this case, the denitration ratio was 84 to 86% and the ammonia concentration in the exhaust gases at the exit of the reactor was 0.5 to 0.8 ppm.

It can be understood from the above that the method is excellent in that it can remove the nitrogen oxides at a high efficiency with less variation range for denitration ratio with extremely less ammonia discharge, which would otherwise cause secondary public pollution.

Figure 8:
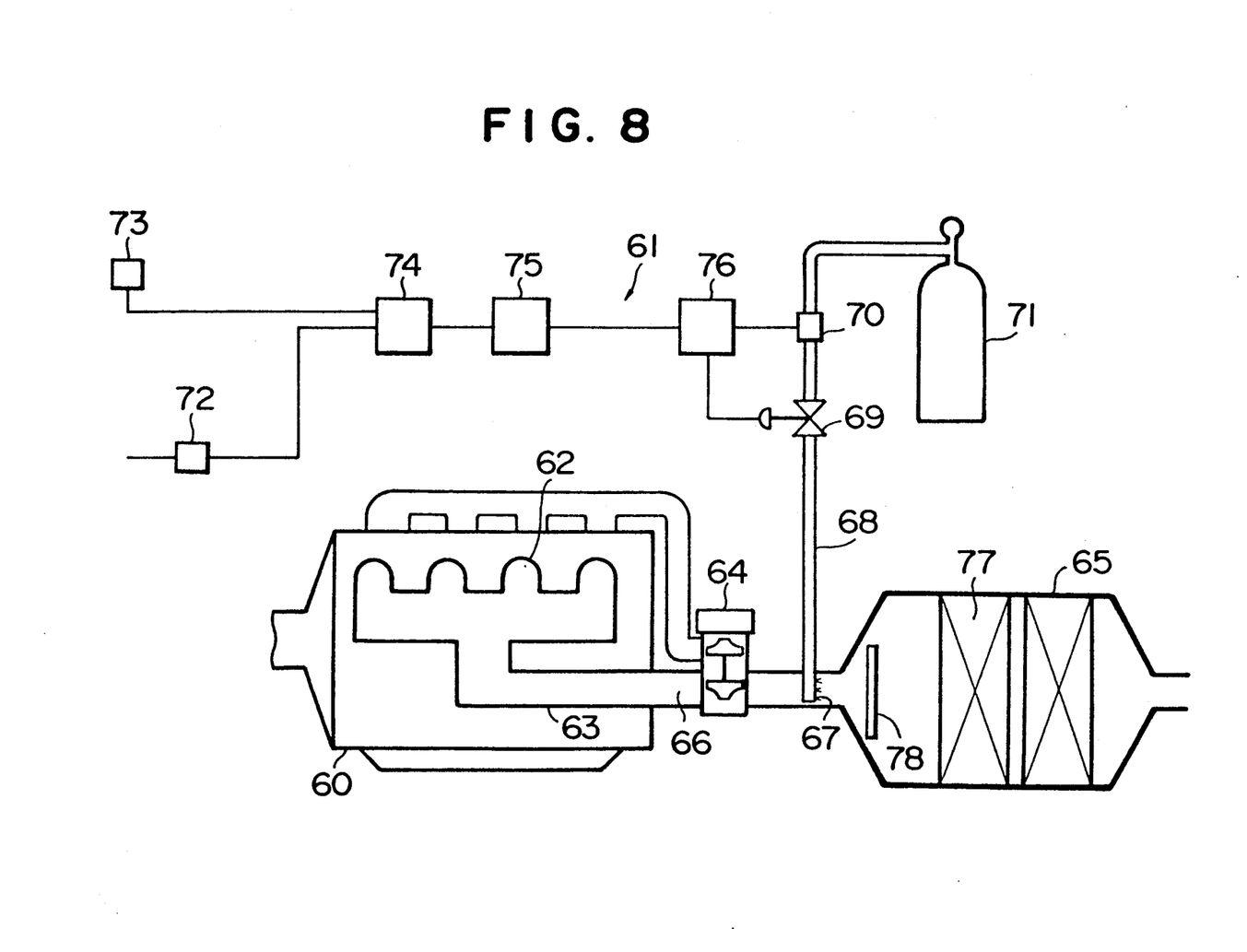
FIG. 8 is a schematic view of a diesel engine equipped with an exhaust gas purifying device for conducting the method as the third aspect of the present invention.

An exhaust gas purifying device 61 equipped with an engine main body 60 shown in FIG. 8 illustrates an example developed for practicing the third aspect of the present invention, and a supercharger 64 and a reactor 65 are disposed to an exhaust gas pipe 63 in communication with a manifold 62. Further, an ammonia transport pipe 68 is connected to an ammonia injection nozzle 67 disposed in an exhaust gas flow channel 66 in the exhaust pipe 63 at the upstream to the reactor 65, and an ammonia control valve 69 and an ammonia flow meter 70 are disposed to the ammonia transport pipe 68, as well as an ammonia vessel 71 is connected to the pipe 68.

Then, a fuel flow meter 72 for measuring the consumption amount of fuel supplied to the engine main body 60, a humidity detector 73 for measuring the humidity of in-take air of the engine main body 60 are connected with a calculator 74, which is connected by way of a ratio setter 75 and an ammonia flow rate controller 76 to an ammonia control valve 69.

That is, in response to the load of the engine main body 60, the respective signals from the fuel flow meter 72 and the in-take air humidity detector 73 are inputted into the calculator 74. In the calculator 74, the total discharge amount of the nitrogen oxides is calculated and a signal is inputted into the ratio setter 75, in which the amount of ammonia to be supplied is determined based on an ammonia/nitrogen oxide ratio previously set by the ratio setter 75.

Then, the output from the ratio setter 75 is inputted as an ammonia flow rate signal into an ammonia flow rate controller 76, which controls ON-OFF of the ammonia control valve 69 and controls the amount of the ammonia mixed in the exhaust gases flowing into the reactor 65.

Exhaust gases are flown from the manifold 62 by way of the exhaust pipe 63 into the reactor 65 charged with a catalyst 77.

Ammonia is supplied from the ammonia vessel 71 by way of the ammonia transport pipe 68 and, after controlled to an optimal flow rate by the ammonia control valve 69, mixed way of the ammonia injection nozzle 67 into the exhaust gases in the exhaust pipe 63 and mixed and dispersed as required by a gas dispersion plate 78, passed through the catalyst 77 and then reduces to remove the nitrogen oxides in exhaust gases.

Then, the amount of ammonia supplied is determined in proportion with the amount and the concentration of the nitrogen oxides in the exhaust gases determined based on the measured values for the humidity of in-take air, and the fuel consumption amount of the engine, by which ammonia at a more exact optimal amount can be supplied with good responsivity to the total amount of the nitrogen oxides in the exhaust gases, and the nitrogen oxides can be always removed at a high efficiency in accordance with the engine load and the residue of ammonia after removal can be suppressed as much as possible.

This invention will now be explained referring to an example but the invention is not limited only to the example.

EXAMPLE

A $TiO_2$ honeycomb catalyst containing 2% by weight of $V_2O_5$ and 7% by weight of $WO_3$ (3.2 mm diameter corresponding to 150 mm square, 0.6 mm cell wall thickness and 450 mm length) was charged by $6 \times 6$ in two layers to the reactor 65 in communication with the exhaust pipe 63 of a electric power generating diesel engine.

The calculator 74 and the ratio setter 75 were operated by the device 61 so that the ammonia/nitrogen oxide molar ratio was 0.85 and ammonia was injected into the exhaust gases in the exhaust pipe, and the engine was operated while varying the exhaust gas processing amount from 3,500 to 5,500 $Nm^3$/hr, the exhaust gas temperature from 380° to 430° C. and the nitrogen oxide concentration at the inlet from 700 to 950 ppm. In this case, the denitration ratio was 83 to 86% and the ammonia concentration in the exhaust gases at the exit of the reactor was 0.5 to 1.0 ppm.

It can be understood from the above that the method is excellent in that it can remove the nitrogen oxides at a high efficiency with less variation range for the denitration ratio, with extremely less ammonia discharge, which would otherwise cause secondary public pollution.

Figure 9:
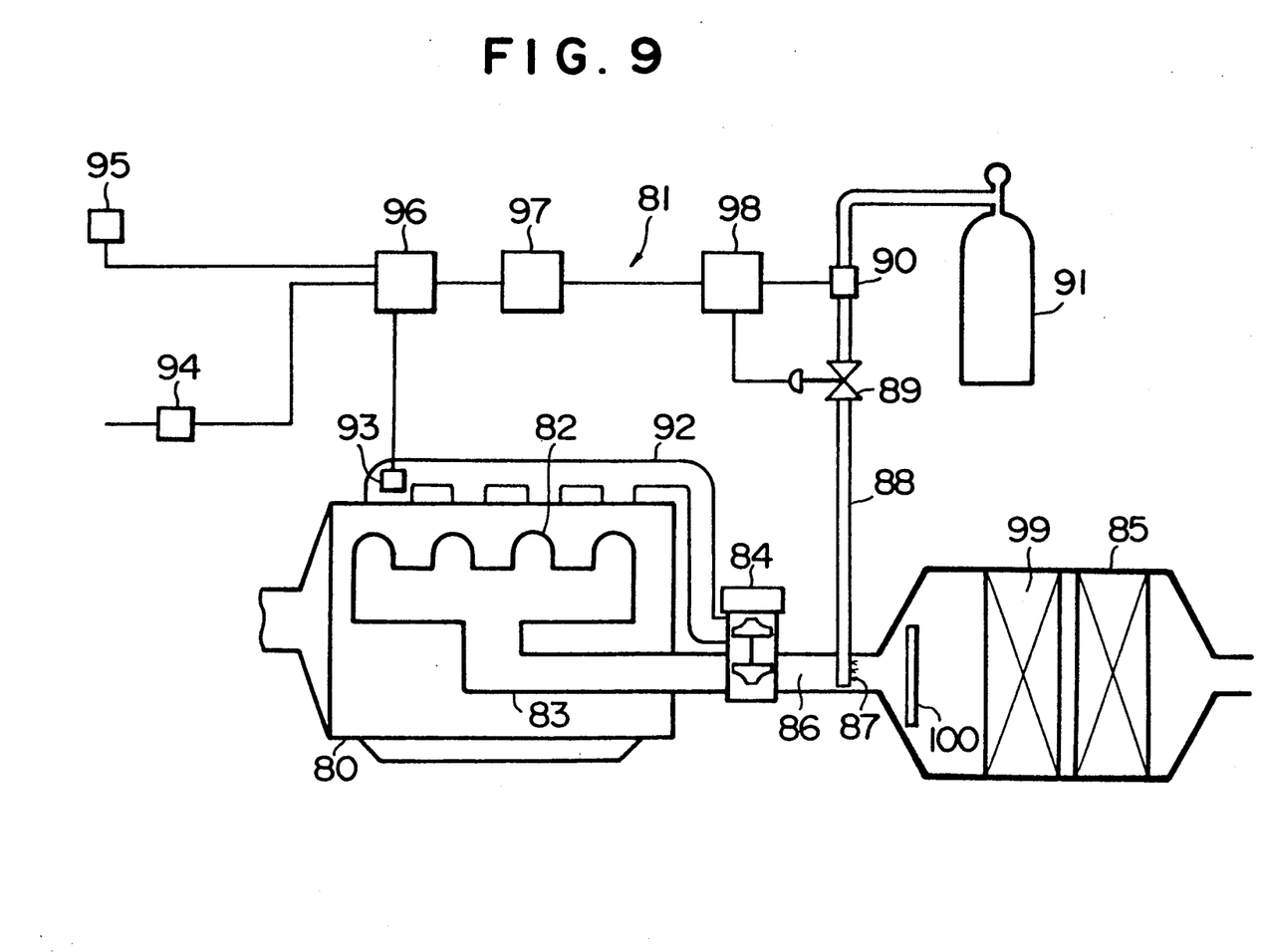
FIG. 9 is a schematic view of a diesel engine equipped with an exhaust gas purifying device for conducting the method as the fourth aspect of the present invention.

An exhaust gas purifying device 81 equipped with an engine main body 80 shown in FIG. 9 illustrates an example developed for practicing the fourth aspect of the present invention, and a supercharger 85 and a reactor 85 are disposed to an exhaust gas pipe 83 in communication with a manifold 82 of the engine main body 80. Further, an ammonia transport pipe 88 is connected to an ammonia injection nozzle 87 disposed in an exhaust gas flow channel 86 in the exhaust pipe 83 at the upstream to the reactor 85, and an ammonia control valve 89 and an ammonia flow meter 90 are disposed to the ammonia transport pipe 88, as well as an ammonia vessel 91 is connected to the pipe 88. Further, a feed air temperature detector 93 is disposed to a feed air pipe 92 for communicating the superfeeder 84 with the engine main body 80.

Then, a fuel flow meter 94 for measuring the consumption amount of fuel supplied to the engine main body 80, a feed air temperature detector 93, a humidity detector 93 for measuring the humidity of in-take air of the engine main body 80 are connected with a calculator 96, which is connected by way of a ratio setter 97 and an ammonia flow rate controller 98 to an ammonia control valve 89.

That is, in response to the load of the engine main body 80, respective signals from the fuel flow meter 94, the feed air temperature detector 93 and the in-take air humidity detector 95 are inputted into the calculator 96. In the calculator 96, the total discharge amount of the nitrogen oxides is calculated and a signal is inputted into the ratio setter 97, in which the amount of ammonia to be supplied is determined based on an ammonia/nitrogen oxide ratio previously set by the ratio setter 97.

Then, the output from the ratio setter 97 is inputted as an ammonia flow rate signal into an ammonia flow rate controller 98, which controls ON-OFF of the ammonia control valve 89 and controls the amount of the ammonia mixed in the exhaust gases flowing into the reactor 85.

Exhaust gases are flown from the manifold 82 by way of the exhaust pipe 83 into the reactor 85 charged with a catalyst 99.

Ammonia is supplied from the ammonia vessel 91 by way of the ammonia transport pipe 98 and, after controlled to an optimal flow rate by the ammonia control valve 89, mixed by way of the ammonia injection nozzle 87 into the exhaust gases in the exhaust pipe 83 and mixed and dispersed, as required, by a gas dispersion plate 100 and passed through the catalyst 99 and then reduces to remove the nitrogen oxides in exhaust gases.

Then, the amount of ammonia supplied is determined in proportion with the amount and the concentration of the nitrogen oxides in the exhaust gases determined based on the measured values for the humidity of in-take air, the fuel consumption amount of engine, and the feed air temperature, by which ammonia at a more exact optimal amount can be supplied with good responsivity to the total amount of the nitrogen oxides in the exhaust gases, and the nitrogen oxides can be always removed at a high efficiency in accordance with the engine load, and residue of ammonia after the removal can be suppressed as much as possible.

This invention will now be explained referring to an example but the invention is not limited only to the example.

EXAMPLE

A $TiO_2$ honeycomb catalyst containing 2% by weight of $V_2O_5$ and 7% by weight of $WO_3$ (3.2 mm diameter corresponding to 150 mm square, 0.6 mm cell wall thickness and 450 mm length) was charged by 6×6 in two layers to the reactor 85 in communication with the exhaust pipe 83 of a electric power generating diesel engine.

The calculator 96 and the ratio setter 97 were operated by the device 81 so that the ammonia/nitrogen oxide molar ratio was 0.85 and ammonia was injected into the exhaust gases in the exhaust pipe, and the engine was operated while varying the exhaust gas processing amount from 3,500 to 5,500 $Nm^3$/hr, the exhaust gas temperature from 380° to 430° C. and the nitrogen oxide concentration at the inlet from 700 to 950 ppm. In this case, the denitration ratio was 82 to 85% and the ammonia concentration in the exhaust gases at the exit of the reactor was 0.4 to 1.1 ppm.

It can be understood from the above that the method is excellent in that it can remove the nitrogen oxides at a high efficiency with less variation range for the denitration ratio, with extremely less ammonia discharge, which would otherwise cause secondary public pollution.

Figure 10:
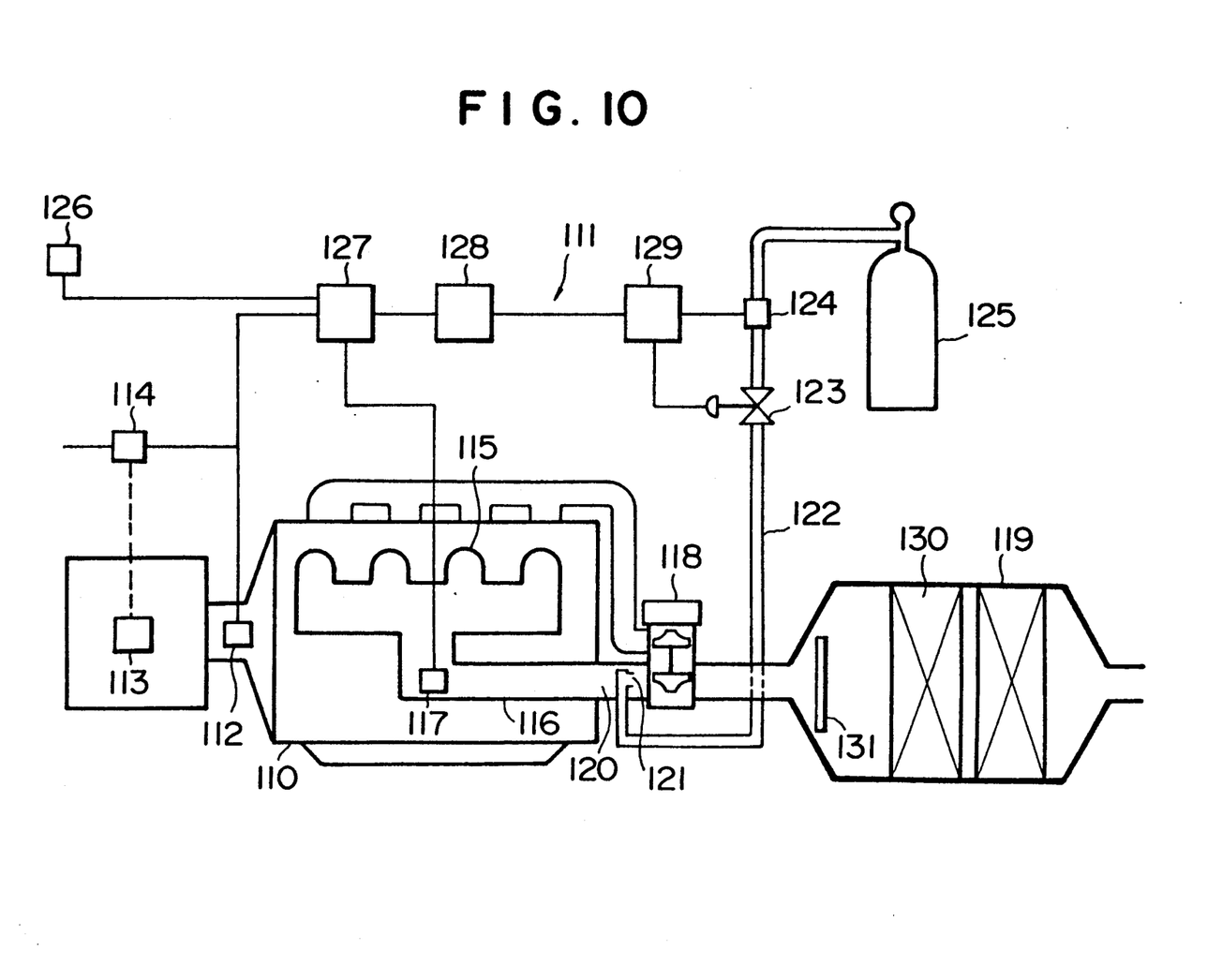
FIG. 10 is a schematic view of a diesel engine equipped with an exhaust gas purifying device for conducting the method as the first and sixth aspects of the present invention.

An exhaust gas purifying device 111 equipped with an engine main body 110 shown in FIG. 10 illustrates an example developed for practicing the first and the sixth aspects of the present invention, in which a power meter 112 or power proportional signaling device 114 for a driven machine 113 is disposed to the engine main body 110, while an exhaust gas temperature detector 117, a supercharger 118 for compressing in-take air and a reactor 119 are disposed to an exhaust gas pipe 116 in communication with a manifold 115.

The supercharger 118 has a known mechanical structure for compressing air supplied to an engine by utilizing the pressure of exhaust gases for enabling the engine power to be increased, in which a turbine blade on the side of an exhaust gas channel 120 and a blower blade on the side of air feeding are connected by way of a shaft and, when the turbine blade on the side of the exhaust gas flow channel 120 is rotated under the pressure of the exhaust gases, the blower blade on the side of the air feeding is also rotated to compress the in-take air for the engine.

Further, an ammonia transport pipe 122 is connected to an ammonia injection nozzle 121 disposed in an exhaust gas flow channel 120 in the exhaust pipe 116 at the upstream to the supercharger 118, and an ammonia control valve 123 and an ammonia flow meter 124 are disposed to the ammonia transport pipe 122, as well as an ammonia vessel 125 is connected to the pipe 122.

Then, the power meter 112 or the power proportional signaling device 114, the exhaust gas temperature detector 117 and a humidity detector 126 for measuring the humidity of in-take air of the engine main body 110 are connected with a calculator 127, which is connected by way of a ratio setter 128 and an ammonia flow rate controller 129 to an ammonia control valve 123.

That is, in response to the load of the engine main body 110, respective signals from the power meter 112 or the proportional signaling device 114, the exhaust gas temperature detector 117 and the in-take air humidity detector 126 are inputted into the calculator 127. In the calculator 127, the total discharge amount of the nitrogen oxides is calculated and a signal is inputted into the ratio setter 128, in which the amount of ammonia to be supplied is determined based on an ammonia/nitrogen oxide ratio previously set by the ratio setter 128.

Then, the output from the ratio setter 128 is inputted as an ammonia flow rate signal into an ammonia flow rate controller 129, which controls ON-OFF of the ammonia control valve 123 and controls the amount of the ammonia mixed in the exhaust gases flowing into the reactor 119 by way of the supercharger 118.

Exhaust gases are flown from the manifold 115 by way of the exhaust pipe 116, through the supercharger 118, into the reactor 119 charged with a catalyst 130.

Ammonia is supplied from the ammonia vessel 125 by way of the ammonia transport pipe 122 and, after controlled to an optimal flow rate by the ammonia control valve 123, mixed by way of the ammonia injection nozzle 121 into the exhaust gases in the exhaust gas flow channel 120 at the upstream to the supercharger 118, sufficiently mixed and stirred with the exhaust gases by the turbine blade of the supercharger 118, and mixed and dispersed as required by a gas dispersion plate 131, entered into the reactor 119 and passed through the catalyst 130 and then reduces to remove the nitrogen oxides in the exhaust gases.

Then, the amount of ammonia supplied is determined in proportion with the amount and the concentration of the nitrogen oxides in the exhaust gases determined based on the measured values for the humidity of in-take air, engine power, and exhaust gas temperature, by which ammonia at a more exact optimal amount can be supplied, with good responsivity to the total amount of the nitrogen oxides, to the upstream of the supercharger in the exhaust gas flow channels, and sufficiently and uniformly mixed in the course of passing through the supercharger and then flown to the reactor.

Accordingly, the nitrogen oxides can always be removed efficiently in response to the engine load without hindering the movement of the diesel engine and with an improved reaction efficiency in the reactor, as well as residue of ammonia after removal can be suppressed as much as possible.

The present invention will be explained referring to an example but the invention is not restricted only to the example.

EXAMPLE

A $TiO_2$ honeycomb catalyst containing 2% by weight of $V_2O_5$ and 7% by weight of $WO_3$ (3.2 mm diameter corresponding to 150 mm square, 0.6 mm cell wall thickness and 450 mm length) was charged by $6 \times 6$ in two layers to the reactor 119 in communication with the exhaust pipe 116 of a electric power generating diesel engine.

The calculator 121 and the ratio setter 128 were operated by the device 111 so that the ammonia/nitrogen oxide molar ratio was 0.85 and ammonia was injected into the exhaust gases in the exhaust pipe, and the engine was operated while varying the exhaust gas processing amount from 3,500 to 5,500 $Nm^3$/hr, the exhaust gas temperature from 380° to 430° C. and the nitrogen oxide concentration at the inlet from 700 to 950 ppm.

In this case, the denitration ratio was 83 to 86% and the ammonia concentration in the exhaust gases at the exit of the reactor was 0.5 to 1.0 ppm.

It can be understood from the above that the method is excellent in that it can remove the nitrogen oxides at a high efficiency with less variation range for the denitration ratio, with extremely less ammonia discharge, which would otherwise cause secondary public pollution, as well as the reaction efficiency on the dinitrating catalyst in the reactor is high since the nitrogen oxides in the exhaust gases are previously mixed sufficiently and uniformly and the engine power is not reduced.

Figure 11:
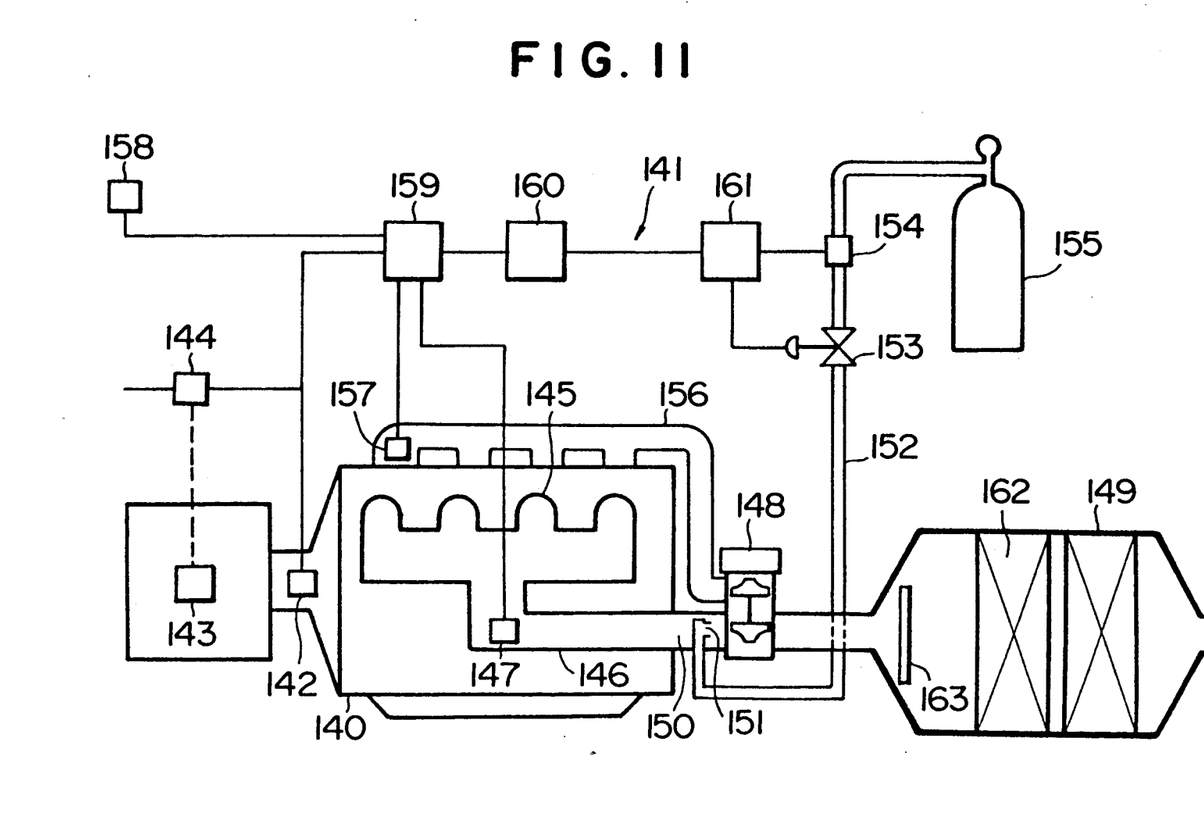
FIG. 11 is a schematic view of a diesel engine equipped with an exhaust gas purifying device for conducting the method as the second and sixth aspects of the present invention.

An exhaust gas purifying device 141 equipped with an engine main body 140 shown in FIG. 11 illustrates an example developed for practicing the first and the sixth aspects of the present invention, in which a power meter 142 or power proportional signaling device 144 for a driven machine 143 is disposed to the engine main body 140, while an exhaust gas temperature detector 147, a supercharger 148 for compressing in-take air and a reactor 149 are disposed to to an exhaust gas pipe 146 in communication with a manifold 145 of the engine main body.

The supercharger 148 has a known mechanical structure for compressing air supplied to an engine by utilizing the pressure of exhaust gases for enabling the engine power to be increased, in which a turbine blade on the side of an exhaust gas channel 150 and a blower blade on the side of air feeding are connected by way of a shaft and, when the turbine blade on the side of the exhaust gas flow channel 150 is rotated under the pressure of the exhaust gases, the blower blade on the side of the air feeding is also rotated to compress the in-take air for the engine.

Further, an ammonia transport pipe 152 is connected to an ammonia injection nozzle 151 disposed in an exhaust gas flow channel 150 in the exhaust pipe 146 at the upstream to the supercharger 148, and an ammonia control valve 153 and an ammonia flow meter 154 are disposed to the ammonia transport pipe 152, as well as an ammonia vessel 155 is connected to the pipe 152. Further, a feed air temperature detector 157 is disposed to a feed air pipe 156 for communication of the supercharger 148 with the engine main body 140.

Then, the power meter 142 or the power proportional signaling device 144, the exhaust gas temperature detector 147, the feed air temperature detector 157 and the humidity detector 158 for measuring the humidity of in-take air of the engine main body 140 are connected with a calculator 159, which is connected by way of a ratio setter 160 and an ammonia flow rate controller 161 to the ammonia control valve 153.

That is, in response to the load of the engine main body 140, respective signals from the engine power meter 142 or the proportional signaling device 144, the exhaust gas temperature detector 147, feeder air temperature detector 157 the in-take air humidity, and detector 158 are inputted into the calculator 159. In the calculator 159, the total discharge amount of the nitrogen oxides is calculated and a signal is inputted into the ratio setter 160, in which the amount of ammonia to be supplied is determined based on an ammonia/nitrogen oxide ratio previously set by the ratio setter 160.

Then, the output from the ratio setter 160 is inputted as an ammonia flow rate signal into an ammonia flow rate controller 161, which controls ON-OFF of the ammonia control valve 153 and controls the amount of the ammonia mixed in the exhaust gases flowing into the reactor 149 by way of the supercharger 148.

Exhaust gases are flown from the manifold 145 by way of the exhaust pipe 146, through the supercharger 148, into the reactor 149 charged with a catalyst 162.

Ammonia is supplied from the ammonia vessel 155 by way of the ammonia transport pipe 152 and, after controlled to an optimal flow rate by the ammonia control valve 153, mixed by way of the ammonia injection nozzle 151 into the exhaust gases in the exhaust gas flow channel 150 at the upstream to the supercharger 148, sufficiently mixed and stirred with the exhaust gases by the turbine blade of the supercharger 148, and mixed and dispersed as required by a gas dispersion plate 163, entered into the reactor 149 and passed through the catalyst 162 and then reduces to remove the nitrogen oxides in the exhaust gases.

Then, the amount of ammonia supplied is determined in proportion with the amount and the concentration of the nitrogen oxides in the exhaust gases determined based on the measured values for the humidity of in-take air, engine power, and exhaust gas temperature, by which ammonia at a more exact optimal amount can be supplied, with good responsivity to the total amount of the nitrogen oxides, to the upstream of the supercharger in the exhaust gas flow channels, and sufficiently and uniformly mixed in the course of passing through the supercharger and then flown to the reactor. Accordingly, the nitrogen oxides can always be removed efficiently in response to the engine load without hindering the movement of the diesel engine and with an improved reaction efficiency in the reactor, as well as residue of ammonia after removal can be suppressed as much as possible.

The present invention will be explained referring to an example but the invention is not restricted only to the example.

EXAMPLE

A $TiO_2$ honeycomb catalyst containing 2% by weight of $V_2O_5$ and 7% by weight of $WO_3$ (3.2 mm diameter corresponding to 150 mm square, 0.6 mm cell wall thickness and 450 mm length) was charged by 6×6 in two layers to the reactor 149 in communication with the exhaust pipe 146 of a electric power generating diesel engine.

The calculator 159 and the ratio setter 160 were operated by the device 141 so that the ammonia/nitrogen oxide molar ratio was 0.85 and ammonia was injected into the exhaust gases in the exhaust pipe, and the engine was operated while varying the exhaust gas processing amount from 3,500 to 5,500 $Nm^3$/hr, the exhaust gas temperature from 380° to 430° C. and the nitrogen oxide concentration at the inlet from 700 to 950 ppm.

In this case, the denitration ratio was 84 to 86% and the ammonia concentration in the exhaust gases at the exit of the reactor was 0.5 to 0.8 ppm.

It can be understood from the above that the method is excellent in that it can remove the nitrogen oxides at a high efficiency with less variation range for the denitration ratio, with extremely less ammonia discharge, which would otherwise cause secondary public pollution, as well as the reaction efficiency on the dinitrating catalyst in the reactor is high since the nitrogen oxides in the exhaust gases are previously mixed sufficiently and uniformly and the engine power is not reduced.

Figure 12:
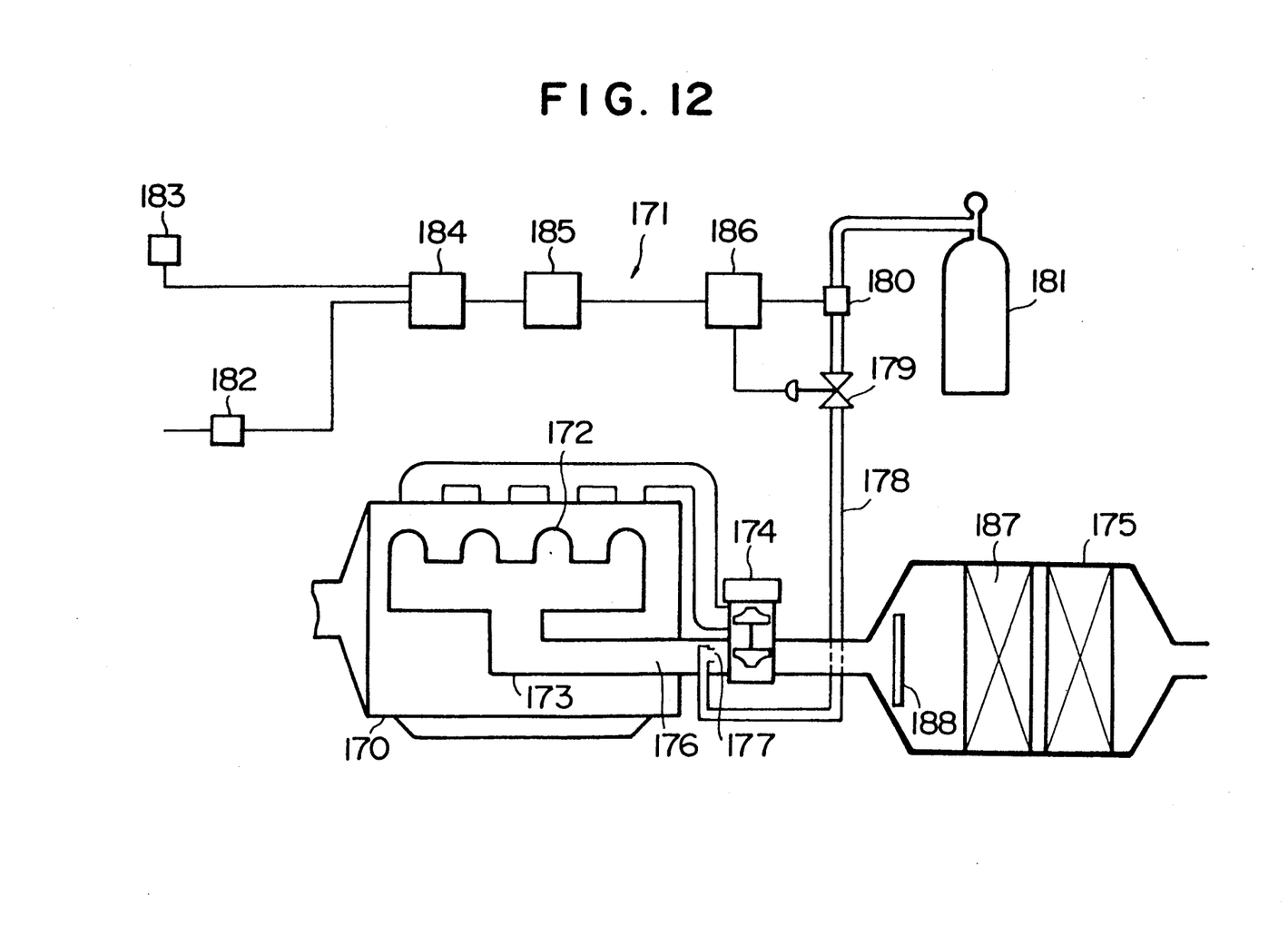
FIG. 12 is a schematic view of a diesel engine equipped with an exhaust gas purifying device for conducting the method as the third and sixth aspects of the present invention.

An exhaust gas purifying device 171 equipped with an engine main body 170 shown in FIG. 12 illustrates an example developed for practicing the first and the sixth aspects of the present invention, in which a supercharger 174 for compressing in-take air and a reactor 175 are disposed to an exhaust gas pipe 173 in communication with a manifold 172 of the engine main body 170.

The supercharger 174 has a known mechanical structure for compressing air supplied to an engine by utilizing the pressure of exhaust gases for enabling the engine power to be increased, in which a turbine blade on the side of an exhaust gas channel 176 and a blower blade on the side of air feeding are connected by way of a shaft and, when the turbine blade on the side of the exhaust gas flow channel 176 is rotated under the pressure of the exhaust gases, the blower blade on the side of the air feeding is also rotated to compress the in-take air for the engine.

Further, an ammonia transport pipe 178 is connected to an ammonia injection nozzle 177 disposed in an exhaust gas flow channel 176 in the exhaust pipe 173 at the upstream to the supercharger 174, and an ammonia control valve 179 and an ammonia flow meter 180 are disposed to the ammonia transport pipe 178 as well as an ammonia vessel 179 is connected to the pipe 178.

Then, a fuel flow meter 182 for measuring the consumption amount of fuel supplied to the engine main body 170, the humidity detector 183 for measuring the humidity of in-take air of the engine main body 170 are connected with a calculator 184, which is connected by way of a ratio setter 185 and an ammonia flow rate controller 186 to the ammonia control valve 179.

That is, in response to the load of the engine main body 170, respective signals from the fuel flow meter 182 and the in-take air humidity detector 183 are inputted into the calculator 184. In the calculator 184, the total discharge amount of the nitrogen oxides is calculated and a signal is inputted into the ratio setter 185, in which the amount of ammonia to be supplied is determined based on an ammonia/nitrogen oxide ratio previously set by the ratio setter 185.

Then, the output from the ratio setter 185 is inputted as an ammonia flow rate signal into an ammonia flow rate controller 186, which controls ON-OFF of the ammonia control valve 179 and controls the amount of the ammonia mixed in the exhaust gases flowing into the reactor 175 by way of the supercharger 174.

Exhaust gases are flown from the manifold 172 by way of the exhaust pipe 173, through the supercharger 174, into the reactor 175 charged with a catalyst 187.

Ammonia is supplied from the ammonia vessel 181 by way of the ammonia transport pipe 152 and, after controlled to an optimal flow rate by the ammonia control valve 179, mixed by way of the ammonia injection nozzle 177 into the exhaust gases in the exhaust gas flow channel 176 at the upstream to the supercharger 174, sufficiently mixed and stirred with the exhaust gases by the turbine blade of the supercharger 174, and mixed and dispersed as required by a gas dispersion plate 188, entered into the reactor 175 and passed through the catalyst 187 and then reduces to remove the nitrogen oxides in the exhaust gases.

Then, the amount of ammonia supplied is determined in proportion with the amount and the concentration of the nitrogen oxides in the exhaust gases determined based on the measured values for the humidity of in-take air and fuel consumption amount of engine, by which ammonia at a more exact optimal amount can be supplied, with good responsivity to the total amount of the nitrogen oxides, to the upstream of the supercharger in the exhaust gas flow channels, and sufficiently and uniformly mixed in the course of passing through the supercharger and then flown to the reactor.

Accordingly, the nitrogen oxides can always be removed efficiently in response to the engine load without hindering the movement of the diesel engine and with an improved reaction efficiency in the reactor, as well as residue of ammonia after removal can be suppressed as much as possible.

The present invention will be explained referring to an example but the invention is not restricted only to the example.

EXAMPLE

A $TiO_2$ honeycomb catalyst containing 2% by weight of $V_2O_5$ and 7% by weight of $WO_3$ (3.2 mm diameter corresponding to 150 mm square, 0.6 mm cell wall thickness and 450 mm length) was charged by 6×6 in two layers to the reactor 175 in communication with the exhaust pipe 173 of a electric power generating diesel engine.

The calculator 184 and the ratio setter 185 were operated by the device 171 so that the ammonia/nitrogen oxide molar ratio was 0.85 and ammonia was injected into the exhaust gases in the exhaust pipe, and the engine was operated while varying the exhaust gas processing amount from 3,500 to 5,500 Nm$^3$/hr, the exhaust gas temperature from 380° to 430° C. and the nitrogen oxide concentration at the inlet from 700 to 950 ppm.

In this case, the denitration ratio was 84 to 86% and the ammonia concentration in the exhaust gases at the exit of the reactor was 0.5 to 1.0 ppm.

It can be understood from the above that the method is excellent in that it can remove the nitrogen oxides at a high efficiency with less variation range for the denitration ratio, with extremely less ammonia discharge, which would otherwise cause secondary public pollution, as well as the reaction efficiency on the denitrating catalyst in the reactor is high since the nitrogen oxides in the exhaust gases are previously mixed sufficiently and uniformly and the engine power is not reduced.

Figure 13:
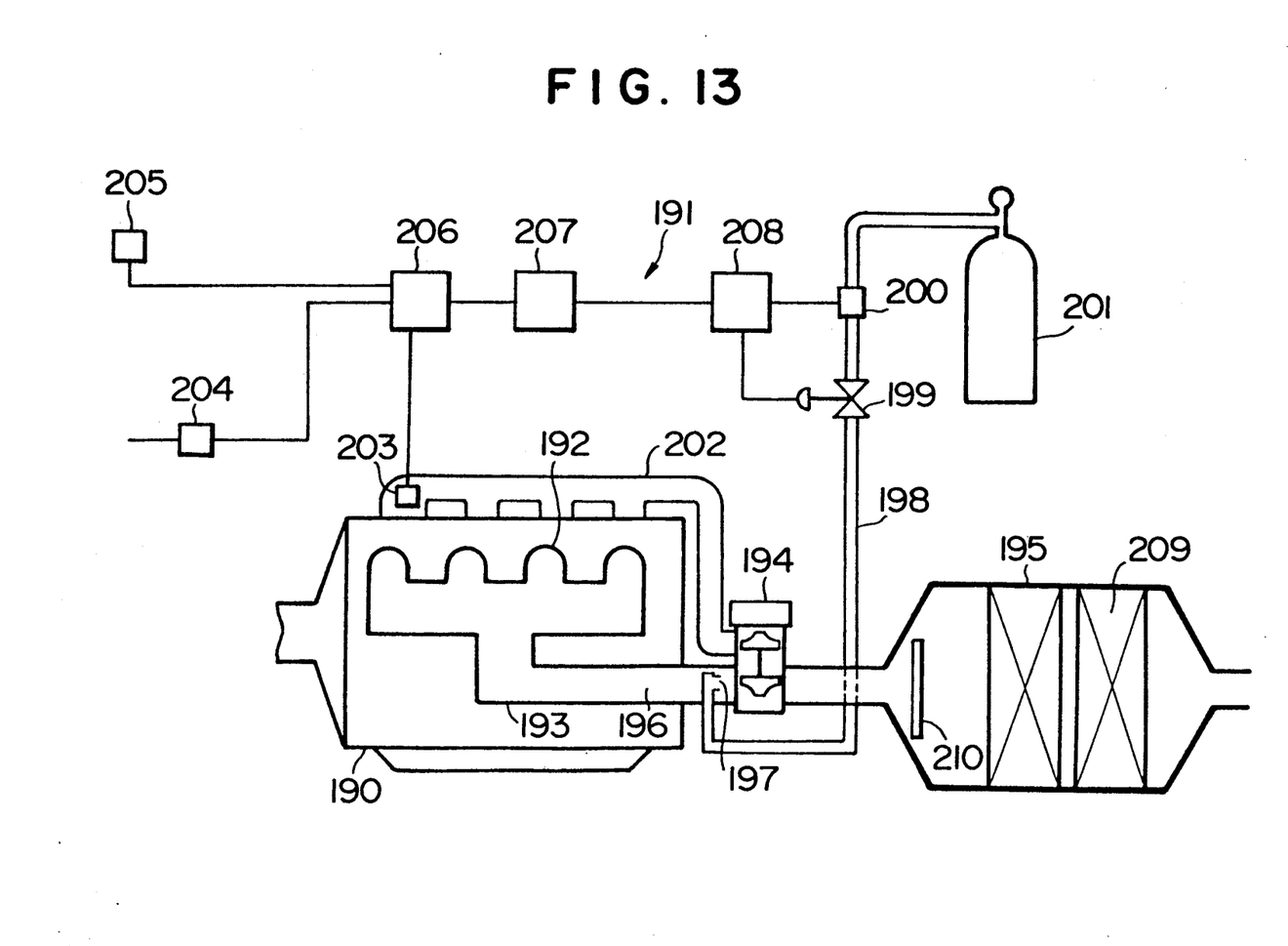
FIG. 13 is a schematic view of a diesel engine equipped with an exhaust gas purifying device for conducting the method as the fourth and sixth aspects of the present invention.

An exhaust gas purifying device 191 equipped with an engine main body 190 shown in FIG. 13 illustrates an example developed for practicing the first and the sixth aspects of the present invention, in which a supercharger 194 for compressing in-take air and a reactor 195 are disposed to an exhaust gas pipe 193 in communication with a manifold 192 of the engine main body 190.

The supercharger 194 has a known mechanical structure for compressing air supplied to an engine by utilizing the pressure of exhaust gases for enabling the engine power to be increased, in which a turbine blade on the side of an exhaust gas channel 196 and a blower blade on the side of air feeding are connected by way of a shaft and, when the turbine blade on the side of the exhaust gas flow channel 196 is rotated under the pressure of the exhaust gases, the blower blade on the side of the air feeding is also rotated to compress the in-take air for the engine.

Further, an ammonia transport pipe 198 is connected to an ammonia injection nozzle 197 disposed in an exhaust gas flow channel 196 in the exhaust pipe 193 at the upstream to the supercharger 194, and an ammonia control valve 199 and an ammonia flow meter 200 are disposed to the ammonia transport pipe 198 as well as an ammonia vessel 201 is connected to the pipe 198.

Then, a fuel flow meter 204 for measuring the consumption amount of fuel supplied to the engine main body 190, the humidity detector 205 for measuring the humidity of in-take air of the engine main body 190 are connected with a calculator 206, which is connected by way of a ratio setter 207 and an ammonia flow rate controller 208 to the ammonia control valve 199.

That is, in response to the load of the engine main body 190, respective signals from the fuel flow meter 204 and the in-take air humidity detector 205 are inputted into the calculator 206. In the calculator 206, the total discharge amount of the nitrogen oxides is calculated and a signal is inputted into the ratio setter 207, in which the amount of ammonia to be supplied is determined based on an ammonia/nitrogen oxide ratio previously set by the ratio setter 207.

Then, the output from the ratio setter 207 is inputted as an ammonia flow rate signal into an ammonia flow rate controller 208, which controls ON-OFF of the ammonia control valve 199 and controls the amount of the ammonia mixed in the exhaust gases flowing into the reactor 195 by way of the supercharger 194.

Exhaust gases are flown from the manifold 192 by way of the exhaust pipe 193, through the supercharger 194, into the reactor 195 charged with a catalyst 209.

Ammonia is supplied from the ammonia vessel 201 by way of the ammonia transport pipe 198 and, after controlled to an optimal flow rate by the ammonia control valve 199, mixed by way of the ammonia injection nozzle 197 into the exhaust gases in the exhaust gas flow channel 196 at the upstream to the supercharger 194, sufficiently mixed and stirred with the exhaust gases by the turbine blade of the supercharger 194, and mixed and dispersed as required by a gas dispersion plate 210, entered into the reactor 195 and passed through the catalyst 109 and then reduces to remove the nitrogen oxides in the exhaust gases.

Then, the amount of ammonia supplied is determined in proportion with the amount and the concentration of the nitrogen oxides in the exhaust gases determined based on the measured values for the humidity of intake air, fuel consumption amount of engine and feeding air temperature, by which ammonia at a more exact optimal amount can be supplied, with good responsivity to the total amount of the nitrogen oxides, to the upstream of the supercharger in the exhaust gas flow channels, and sufficiently and uniformly mixed in the course of passing through the supercharger and then flown to the reactor. Accordingly, the nitrogen oxides can always be removed efficiently in response to the engine load without hindering the movement of the diesel engine and with an improved reaction efficiency in the reactor, as well as residue of ammonia after removal can be suppressed as much as possible.

The present invention will be explained referring to an example but the invention is not restricted only to the example.

EXAMPLE

A TiO$_2$ honeycomb catalyst containing 2% by weight of V$_2$O$_5$ and 7% by weight of WO$_3$ (3.2 mm diameter corresponding to 150 mm square, 0.6 mm cell wall thickness and 450 mm length) was charged by 6×6 in two layers to the reactor 195 in communication with the exhaust pipe 193 of a electric power generating diesel engine.

The calculator 206 and the ratio setter 297 were operated by the device 191 so that the ammonia/nitrogen oxide molar ratio was 0.85 and ammonia was injected into the exhaust gases in the exhaust pipe, and the engine was operated while varying the exhaust gas processing amount from 3,500 to 5,500 Nm$^3$/hr, the exhaust gas temperature from 380° to 430° C. and the nitrogen oxide concentration at the inlet from 700 to 950 ppm.

In this case, the denitration ratio was 82 to 85% and the ammonia concentration in the exhaust gases at the exit of the reactor was 0.4 to 1.1 ppm.

It can be understood from the above that the method is excellent in that it can remove the nitrogen oxides at a high efficiency with less variation range for the denitration ratio, with extremely less ammonia discharge, which would otherwise cause secondary public pollution, as well as the reaction efficiency on the dinitrating catalyst in the reactor is high since the nitrogen oxides in the exhaust gases are previously mixed sufficiently and uniformly and the engine power is not reduced.

The shape of the catalyst used in the present invention can include pellet-like, spherical, granullar, plate-like, tubular, honeycomb-like shape, etc.

In particular, a honeycomb-like shape is preferred since the necessary amount of the catalyst may be reduced because of large geometrical surface area and low pressure loss in the catalyst layer.

There are no particular restrictions for the catalyst compositions used in the present invention and a catalyst mainly comprising titanium or a zeolite type catalyst is preferred.

In particular, a preferred result can be provided by a catalyst comprising a titanium-containing oxide as the ingredient A by from 60 to 99.5% by weight and an oxide of at least one element selected from the group consisting of vanadium, tungsten, molybdenum, manganese, copper, iron, cobalt, cerium and tin as the ingredient B within a range from 0.5 to 40% by weight.

A preferred result can be provided by an oxide containing titanium as the catalyst ingredient A and it can include, for example, titanium oxide, a binary composite oxide of titanium and silicon (hereinafter referred to as $TiO_2-SiO_2$), a binary composite oxide of titanium and zirconium, a ternary composite oxide comprising titanium, silicon and zirconium, etc. A preferred result can be provided with the specific surface area of the ingredient A of greater than 10 $m^2/g$, particularly, greater than 20 $m^2/g$.

As the reducing agent used in the present invention, there can be employed ammonia gas, aqueous ammonia and other urea, as well as ammonium salt such as ammonium nitrate that releases ammonia upon heat decomposition. The exhaust gases discharged from a diesel engine as the object of the present invention usually comprise a composition containing from 10 to 1000 ppm of ammonia, 2 to 21% by volume of oxygen, 5 to 15% by volume of gaseous carbon dioxide, 5 to 15% by volume of water content, 0.02 to 1 $g/Nm^3$ of soot and about 200 to 3000 ppm of nitrogen oxide. However, there is no particular restriction for the range of the compositions so long as they are exhaust gases discharged from internal combustion engines such as diesel engines or gas engines. As the processing condition, reaction temperature from 150° to 650° C., particularly, 200° to 600° C. is preferred.

The special gas velocity is preferably within a range from 2,000 to 100,000 $hr^{-1}$, particularly, 5,000 to 50,000 $hr^{-1}$.

Preferred addition amount of ammonia is from 0.3 to 1.2 parts by volume based on one part by volume of the nitrogen oxides and it is used, preferably, at a molar ratio of ammonia/nitrogen oxide of less than 1 since it is usually required to suppress unreacted ammonia as less as possible.

Advantageous effects obtained according to the present invention are as follows.

(1) Nitrogen oxides can be removed at high level with high efficiency in rapid response to abrupt change of the amount of nitrogen oxides along with the abrupt change of exhaust gas property and change of engine load, as well as the amount of ammonia in the exhaust gases released together with exhaust gases after the removal of nitrogen oxides can be minimized, thus causing no worry for secondary public pollution and providing a great practical merit.

(2) The foregoing effect can be obtained by two measuring factors comprising the humidity of in-take air as a specific factor and one of selected factors, which is effective for power-saving of the device.

(3) Since no additional pressure loss is caused to the diesel engine, it does not reduce the power of the diesel engine.

(4) Since the size of the injection nozzle for the ammonia supply port can optionally be selected, a worry that the injection nozzle is clogged due to dusts in the exhaust gases is eliminated and maintainance such as cleaning is no more necessary.

What is claimed is:

1. A method of removing nitrogen oxides in exhaust gases from a diesel engine, comprising the steps of:
    using a catalyst in a reactor under the presence of ammonia,
    measuring in-take air humidity as a specific measuring factor and at least one of engine power, fuel consumption, engine in-take air temperature and exhaust gas temperature as other measuring factors,
    controlling the flow rate of ammonia based on said measured factors, and
    supplying said controlled flow of ammonia into an exhaust gas flow channel from the engine to the reactor.

2. A method of removing nitrogen oxides in exhaust gases from a diesel engine as defined in claim 1, wherein the flow rate of ammonia is controlled based on the measuring factors of the in-take air humidity, engine power and exhaust gas temperature.

3. A method of removing nitrogen oxides in exhaust gas from a diesel engine as defined in claim 1, wherein the flow rate of ammonia is controlled based on the measuring factors of the in-take air humidity, engine power, exhaust gas temperature and engine in-take air temperature.

4. A method of removing nitrogen oxides in exhaust gases from a diesel engine as defined in claim 1, wherein the flow rate of ammonia is controlled based on the measuring factors of the in-take air humidity and fuel consumption.

5. A method of removing nitrogen oxides in exhaust gases from a diesel engine as defined in claim 1, wherein the flow rate of ammonia is controlled based on the measuring factors of the in-take air humidity, fuel consumption and engine in-take air temperature.

6. A method of removing nitrogen oxides in exhaust gases from a diesel engine as defined in any one of claims 1 to 5, wherein said step of supplying includes the step of supplying ammonia into the exhaust gas flow channel between a supercharger and the reactor downstream thereto.

7. A method of removing nitrogen oxides in exhaust gases from a diesel engine as defined in any one of claims 1 to 5, wherein said step of supplying includes the step of supplying ammonia upstream of a supercharger in the exhaust gas flow channel.

* * * * *